United States Patent
Chen et al.

(10) Patent No.: US 9,610,820 B1
(45) Date of Patent: Apr. 4, 2017

(54) VEHICLE SUSPENSION WITH JOUNCE BUMPER AND STRIKER

(71) Applicants: Song Chen, Troy, MI (US); Paul D Logan, Royal Oak, MI (US); Frederick J Zweng, Rochester Hills, MI (US); Saravanan Ganeshmurthy, Auburn Hills, MI (US)

(72) Inventors: Song Chen, Troy, MI (US); Paul D Logan, Royal Oak, MI (US); Frederick J Zweng, Rochester Hills, MI (US); Saravanan Ganeshmurthy, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/925,538

(22) Filed: Oct. 28, 2015

(51) Int. Cl.
| | |
|---|---|
| *B60G 15/04* | (2006.01) |
| *B60G 3/18* | (2006.01) |
| *B60G 3/20* | (2006.01) |
| *B60G 7/04* | (2006.01) |
| *B60G 11/54* | (2006.01) |
| *B60G 7/00* | (2006.01) |

(52) U.S. Cl.
CPC .............. *B60G 15/04* (2013.01); *B60G 3/18* (2013.01); *B60G 3/20* (2013.01); *B60G 7/001* (2013.01); *B60G 7/04* (2013.01); *B60G 11/54* (2013.01); *B60G 2202/12* (2013.01); *B60G 2202/143* (2013.01); *B60G 2202/25* (2013.01); *B60G 2204/125* (2013.01); *B60G 2204/4502* (2013.01)

(58) Field of Classification Search
CPC ........ B60G 11/54; B60G 15/04; B60G 7/001; B60G 7/04; B60G 3/06; B60G 3/18; B60G 3/20; B60G 2202/12; B60G 2202/143; B60G 2204/124; B60G 2204/125; B60G 2204/129; B60G 2204/4502

See application file for complete search history.

(56) References Cited

U.S. PATENT DOCUMENTS

| | | | | |
|---|---|---|---|---|
| 2,162,828 A | * | 6/1939 | Slack | B60G 3/20 280/124.141 |
| 2,761,696 A | * | 9/1956 | Brown | B60G 3/20 267/221 |
| 3,069,149 A | * | 12/1962 | Neff | B60G 7/04 267/33 |
| 3,086,792 A | * | 4/1963 | Schultz | B60G 7/005 267/33 |
| 4,690,428 A | * | 9/1987 | Fluegge | B60G 11/16 267/292 |
| 5,467,970 A | * | 11/1995 | Ratu | B60G 7/04 267/152 |

(Continued)

*Primary Examiner* — Laura Freedman
(74) *Attorney, Agent, or Firm* — Ralph E. Smith

(57) ABSTRACT

In accordance with an aspect of the present disclosure, a vehicle suspension includes an upper member, a lower member, a spring, a jounce bumper, and a striker. The lower member is configured to pivot relative to the upper member. The spring is configured to bias the lower member away from the upper member. The jounce bumper is fixedly coupled to one of the upper and lower members. The striker is fixedly coupled to the other one of the upper and lower members. The striker has a striker surface configured to contact the jounce bumper when the lower member is pivoted to compress the spring greater than a predetermined amount. The striker surface is convex toward the jounce bumper.

17 Claims, 4 Drawing Sheets

(56) References Cited

U.S. PATENT DOCUMENTS

| | | | |
|---|---|---|---|
| 6,196,564 B1* | 3/2001 | Hawener | B60G 7/04 |
| | | | 280/124.162 |
| 6,733,023 B2 | 5/2004 | Remmert et al. | |
| 7,172,182 B2* | 2/2007 | Huprikar | B60G 13/003 |
| | | | 267/153 |
| 7,387,307 B2* | 6/2008 | Tanaka | B60G 3/202 |
| | | | 280/124.135 |
| 7,416,175 B2* | 8/2008 | Al-Dahhan | B60G 11/15 |
| | | | 267/140 |
| 7,530,587 B2* | 5/2009 | Okamoto | F16F 9/58 |
| | | | 280/124.147 |
| 8,276,894 B2 | 10/2012 | Dickson | |
| 2008/0012188 A1* | 1/2008 | Dickson | F16F 1/3732 |
| | | | 267/139 |
| 2009/0127043 A1* | 5/2009 | Dickson | B60G 11/22 |
| | | | 188/380 |
| 2013/0161888 A1 | 6/2013 | Szekely et al. | |

\* cited by examiner

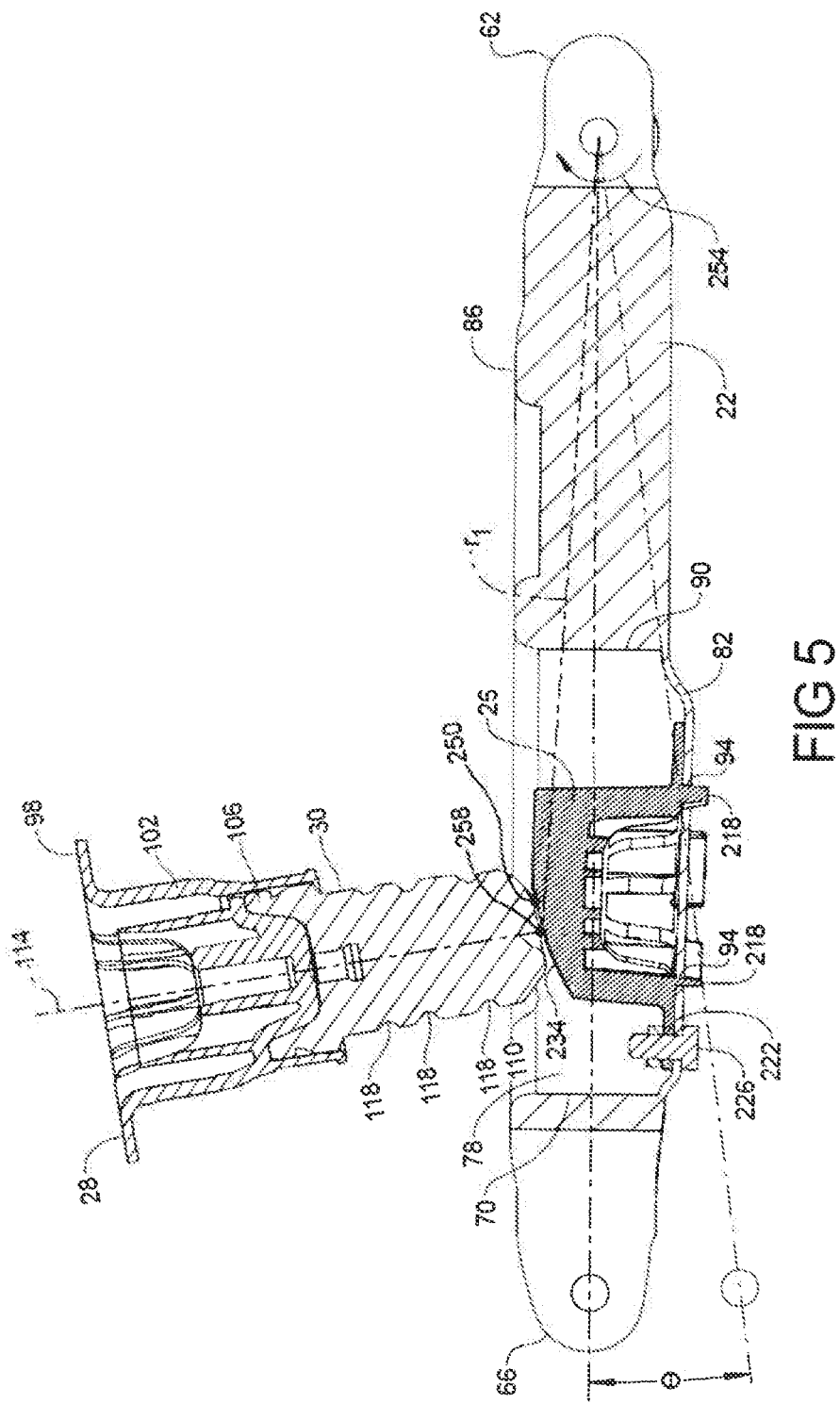

VEHICLE SUSPENSION WITH JOUNCE BUMPER AND STRIKER

FIELD

The present disclosure relates to a vehicle suspension with a jounce bumper and striker.

BACKGROUND

This section provides background information related to the present disclosure and is not necessarily prior art.

Vehicles typically include front and rear suspension components to improve ride and handling of the vehicle. A vehicle suspension system, such as a rear suspension for example, typically includes a primary spring and a shock absorber. The primary spring resiliently supports the vehicle's chassis and body relative to a wheel of the vehicle. In some applications, the primary spring is a compression style coil spring. The shock absorber is configured to absorb and dampen vibration of the primary spring.

Vehicle suspensions typically also include a striker and a secondary spring device that is commonly known as a "jounce bumper" or a "bump-stop". The striker and jounce bumper are mounted to components of the vehicle body, chassis, or suspension (e.g. a spring link or arm) that are coupled to each other for relative movement. Typically, the striker and jounce bumper pivot relative to each other and are aligned to contact one another at a predetermined pivot angle. The jounce bumper is typically a rubber or resilient polymer material and is positioned to impact the striker before the primary spring bottoms out. The jounce bumper is generally configured to compress against a contact surface of the striker and prevent bottoming out of the primary spring.

The contact surface of typical strikers is flat or concave. The pivoting motion of the striker relative to the jounce bumper can create undesirable side loading forces as the jounce bumper compresses against the flat or concave contact surface. These side loading forces can result in the jounce bumper bending instead of compressing throughout the jounce bumper's designed compression range.

SUMMARY

This section provides a general summary of the disclosure, and is not a comprehensive disclosure of its full scope or all of its features.

In accordance with an aspect of the present disclosure, a vehicle suspension includes an upper member, a lower member, a spring, a jounce bumper, and a striker. The lower member is configured to pivot relative to the upper member. The spring is configured to bias the lower member away from the upper member. The jounce bumper is fixedly coupled to one of the upper and lower members. The striker is fixedly coupled to the other one of the upper and lower members. The striker has a striker surface configured to contact the jounce bumper when the lower member is pivoted to compress the spring greater than a predetermined amount. The striker surface is convex toward the jounce bumper.

In accordance with an aspect of the present disclosure, an entire surface area of the striker surface that is configured to contact the jounce bumper is convex.

In accordance with an aspect of the present disclosure, the suspension further includes a chassis. The lower member has opposing ends including a chassis attachment end and a hub attachment end. The chassis attachment end is pivotably coupled to the chassis. The hub attachment end is configured to be coupled to a wheel hub. The striker includes a base mounted to the lower member. The striker surface slopes toward the base with increased distance from the chassis attachment end.

In accordance with an aspect of the present disclosure, the lower member extends in an outboard direction from the chassis attachment end to the hub attachment end.

In accordance with an aspect of the present disclosure, the spring is a coil spring coiled about the jounce bumper and the striker.

In accordance with an aspect of the present disclosure, the lower member is movable between a first position wherein the jounce bumper makes initial contact with the striker surface, and a second position wherein the jounce bumper is compressed against the striker surface. The striker surface is curved such that a portion of the striker surface that contacts the jounce bumper remains perpendicular to a central axis of the jounce bumper while the lower member moves between the first and second positions.

In accordance with an aspect of the present disclosure, the striker surface is defined by $$\theta = \left(\frac{\sqrt{r^2 - R^2}}{R}\right) - \tan^{-1}\left(\frac{\sqrt{r^2 - R^2}}{R}\right).$$

In accordance with an aspect of the present disclosure, the jounce bumper is fixedly coupled to the upper member and the striker is fixedly coupled to the lower member.

In accordance with an aspect of the present disclosure, the jounce bumper is fixedly coupled to the lower member and the striker is fixedly coupled to the upper member.

In accordance with an aspect of the present disclosure, a vehicle suspension includes an upper member, a lower member, a spring, a jounce bumper, and a striker. The lower member is configured to pivot between a first position and a second position relative to the upper member. The spring is configured to bias the lower member away from the upper member. The jounce bumper is fixedly coupled to one of the upper and lower members. The striker is fixedly coupled to the other one of the upper and lower members. The striker has a striker surface configured to contact the jounce bumper at an angle that is perpendicular to a central axis of the jounce bumper when the lower member is in the first and second positions.

In accordance with an aspect of the present disclosure, the striker surface is convex toward the jounce bumper along an entire surface area of the striker surface that contacts the jounce bumper when the lower member is between the first and second positions.

In accordance with an aspect of the present disclosure, the vehicle suspension further includes a chassis. The lower member has opposing ends including a chassis attachment end and a hub attachment end. The chassis attachment end is pivotably coupled to the chassis. The hub attachment end is configured to be coupled to a wheel hub. The striker includes a base mounted to the lower member. The striker surface slopes toward the base with increased distance from the chassis attachment end.

In accordance with an aspect of the present disclosure, the lower member extends in an outboard direction from the chassis attachment end to the hub attachment end.

In accordance with an aspect of the present disclosure, the spring is a coil spring coiled about the jounce bumper and the striker.

In accordance with an aspect of the present disclosure, when the lower member is in the first position the jounce bumper makes initial contact with the striker surface. When the lower member is in the second position the jounce bumper is compressed against the striker surface.

In accordance with an aspect of the present disclosure, the striker surface is defined by $$\theta = \left(\frac{\sqrt{r^2 - R^2}}{R}\right) - \tan^{-1}\left(\frac{\sqrt{r^2 - R^2}}{R}\right).$$

In accordance with an aspect of the present disclosure, the jounce bumper is fixedly coupled to the upper member and the striker is fixedly coupled to the lower member.

In accordance with an aspect of the present disclosure, the jounce bumper is fixedly coupled to the lower member and the striker is fixedly coupled to the upper member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a section view similar to FIG. 4, illustrating the vehicle suspension in a second position.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present teachings are directed toward a vehicle suspension configured to reduce side loads between a jounce bumper and a striker of the vehicle suspension. The striker has a contact surface that promotes axial compression of the jounce bumper and reduces side loads on the jounce bumper.

Figure 1:
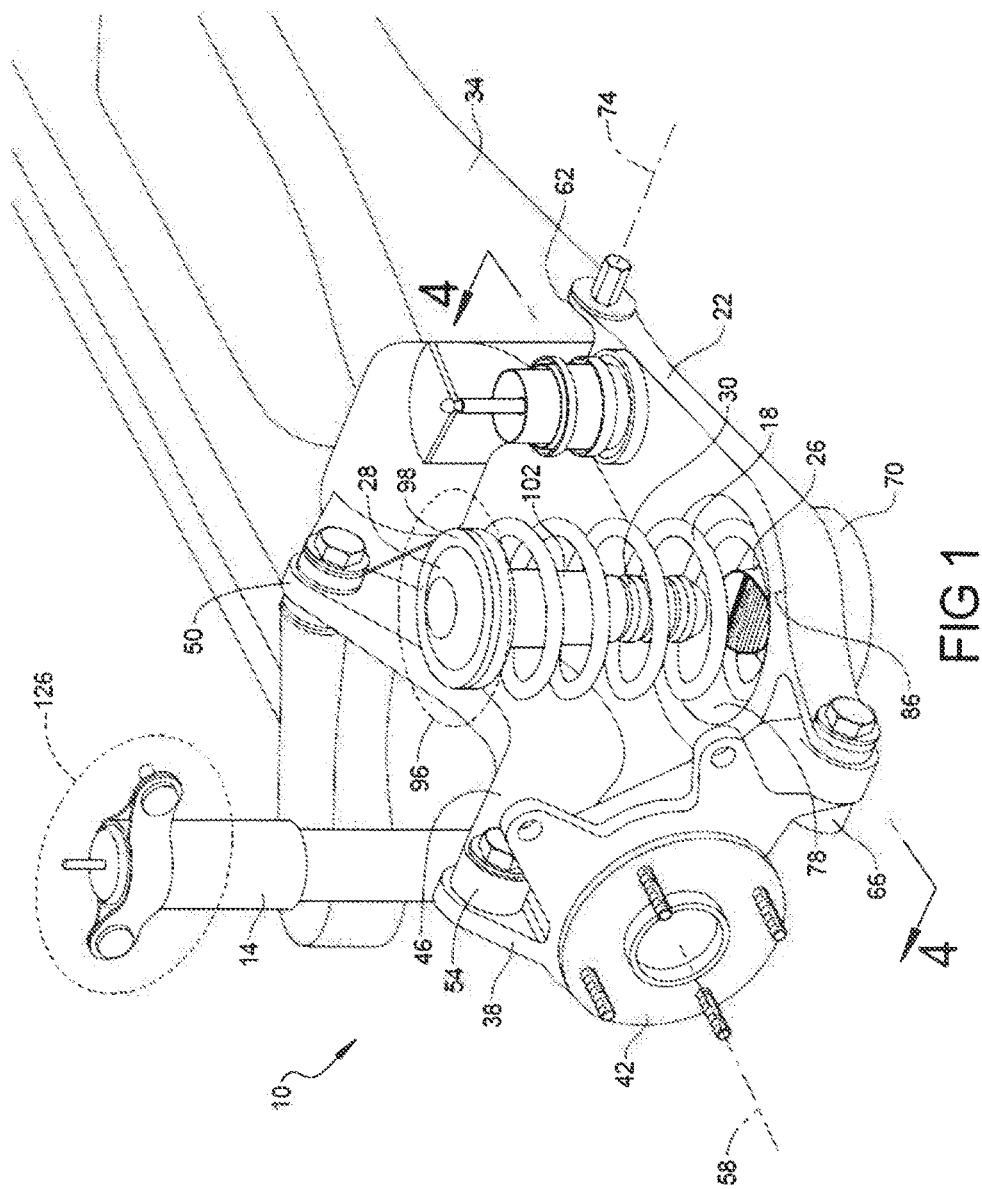
FIG. 1 is a perspective view of a vehicle suspension in accordance with the present teachings.

With reference to FIG. 1, a portion of a vehicle suspension 10 is illustrated. The vehicle suspension 10 generally includes a shock absorber 14, a spring 18, a spring link 22, a striker 26, an upper spring perch 28 and a jounce bumper 30. In the example shown, the vehicle suspension 10 also includes a chassis 34, a hub carrier 38, a hub 42, and an upper arm 46, though other configurations can be used.

The chassis 34 is a rigid structure that typically is fixedly coupled to a body (not shown) of the vehicle. The upper arm 46 is a rigid member having a first end 50 and a second end 54 opposite the first end 50. The first end 50 is pivotably coupled to the chassis 34, and the second end 54 is pivotably coupled to the hub carrier 38. The hub carrier 38 is coupled to the hub 42 and supports the hub 42 for rotation relative to the hub carrier 38. The hub 42 is configured to be fixedly coupled to a wheel (not shown) of the vehicle in a conventional manner (e.g. studs and lug nuts) to permit the wheel to rotate relative to the hub carrier 38 about a rotational axis 58 of the hub 42.

The spring link 22 is a rigid member that has a third end 62, a fourth end 66 opposite the third end 62, and a lower spring perch 70 located between the third and fourth ends 62, 66. The third end 62 is pivotably coupled to the chassis 34 at a location that is spaced apart from the first end 50 of the upper arm 46. The third end 62 is pivotably coupled to the chassis 34 such that the spring link 22 is rotatable relative to the chassis 34 about a first axis 74. The fourth end 66 is pivotably coupled to the hub carrier 38 at a location that is spaced apart from the second end 54 of the upper arm 46.

Figure 4:
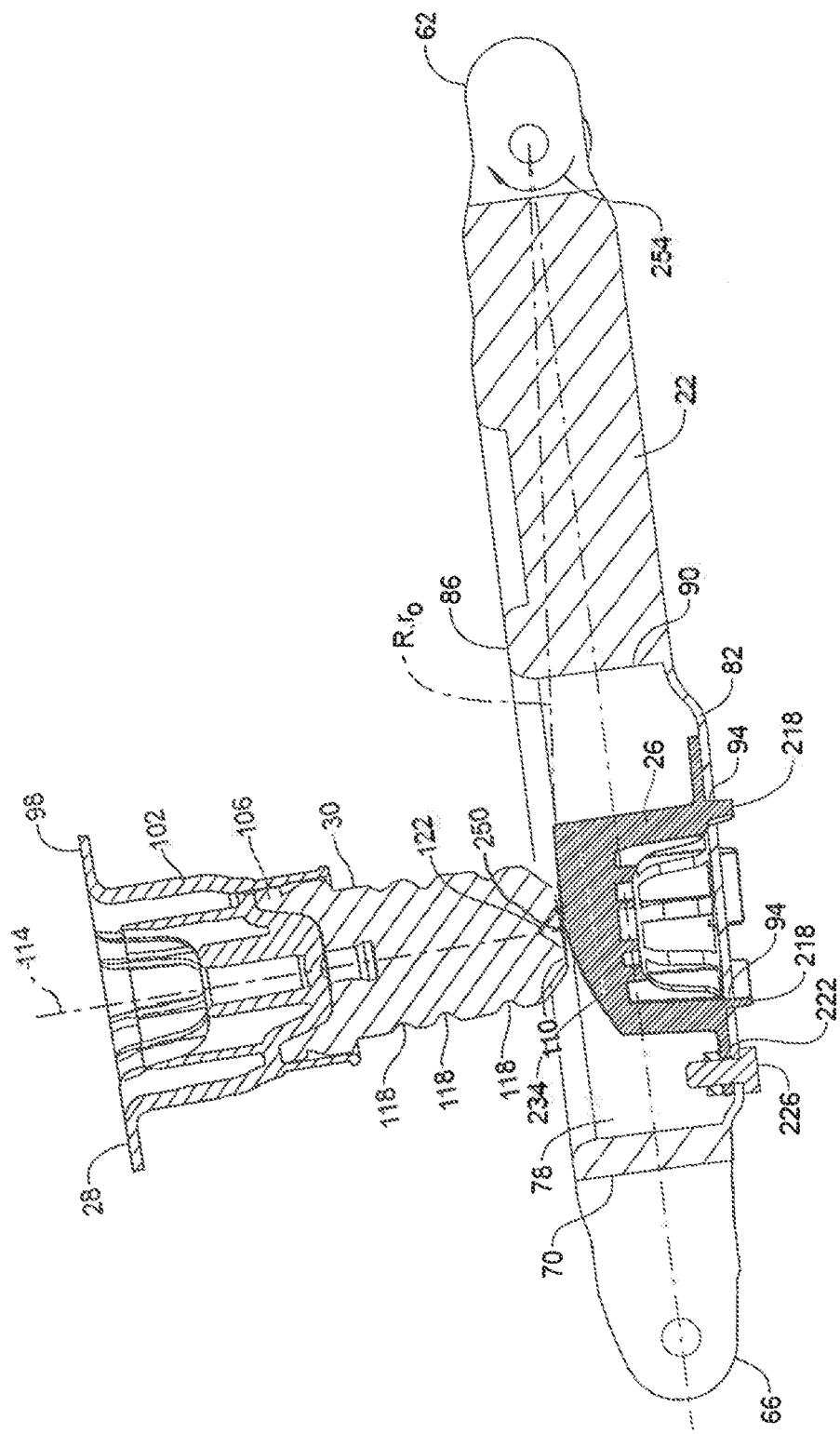
FIG. 4 is a sectional view of a portion of the vehicle suspension of FIG. 1 taken along line 4-4 as shown in FIG. 1, and illustrating the vehicle suspension in a first position.

With continued reference to FIG. 1 and additional reference to FIG. 4, the lower spring perch 70 is configured to support the spring 18 on the spring link 22. In the example provided, the lower spring perch 70 includes a pot-shaped cavity 78 defined by the spring link 22, though other configurations can be used. The cavity 78 includes a bottom wall 82 that is recessed below a top surface 86 of the spring link 22, and a sidewall 90 that extends between the top surface 86 and the bottom wall 82. In the example provided, the bottom wall 82 defines a plurality of apertures 94, though other configurations can be used.

In the example provided, the spring 18 is a compression coil spring formed of a metal material, though other configurations can be used. A lower portion of the spring 18 is received in the cavity 78 and is seated generally on the bottom wall 82. An upper portion of the spring 18, opposite the lower portion, is seated on the upper spring perch 28.

The upper spring perch 28 is mounted to a structure 96 of the vehicle, which can be a portion of the chassis 34 or the body (not shown) of the vehicle. In the example provided, the upper spring perch 28 includes a plate portion 98 and a cylindrical portion 102. The plate portion 98 is generally flat and disc-shaped and is mounted to the structure 96, generally above the lower spring perch 70. The cylindrical portion 102 is fixedly coupled to the plate portion 98 and is generally cylindrical in shape. The cylindrical portion 102 extends from the plate portion 98 downwards toward the lower spring perch 70. The upper portion of the spring 18 is seated on the plate portion 98 of the upper spring perch 28 and the coils of the spring 18 extend coaxially about the cylindrical portion 102 toward the lower portion of the spring 18.

The jounce bumper 30 is a generally cylindrical body having a base 106 and a free end 110. The base 106 is fixedly coupled to the cylindrical portion 102 of the upper spring perch 28. The jounce bumper 30 extends from the base 106 along a second axis 114, downward toward the lower spring perch 70 to the free end 110 which is opposite from the base 106. The jounce bumper 30 is formed of a resilient material, such as rubber or a resilient polymer for example. In the example provided, the jounce bumper 30 defines a plurality of notches that extend circumferentially about the jounce bumper 30 and are positioned between the base 106 and the free end 110. The plurality of notches 118 are configured to aid in controlled compression and expansion of the jounce bumper 30 along the second axis 114. In the example provided, the free end 110 has a frustoconical shape with the frustum proximate to the lower spring perch 70, and the free end 110 defines a conical cavity 122 that is coaxial with the second axis 114, though other configurations can be used.

The shock absorber 14 can be any suitable type of shock absorber, such as a gas-filled or oil-filled piston-cylinder damper for example. The shock absorber 14 is operatively coupled between the hub carrier 38 and a structure 126 of the vehicle which can be a portion of the chassis 34 or body (not shown) of the vehicle. In the example provided, an upper portion of the shock absorber 14 is mounted to the structure 126 of the vehicle for common movement therewith, and a lower portion of the shock absorber 14 is mounted to the hub carrier 38 for movement therewith, though other configurations can be used. In alternative constructions (not specifically shown), the lower portion of the shock absorber 14 is mounted to the spring link 22 or a portion of the upper arm 46 for movement therewith. The shock absorber 14 is configured to dampen oscillation of the hub carrier 38 due to the spring 18.

Figure 2:
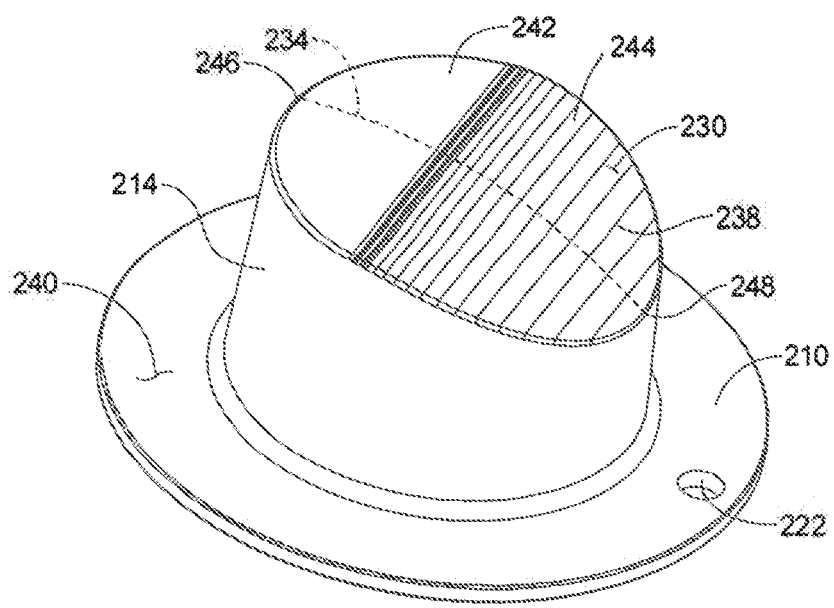
FIG. 2 is a perspective view of a striker of the vehicle suspension of FIG. 1.
Figure 3:
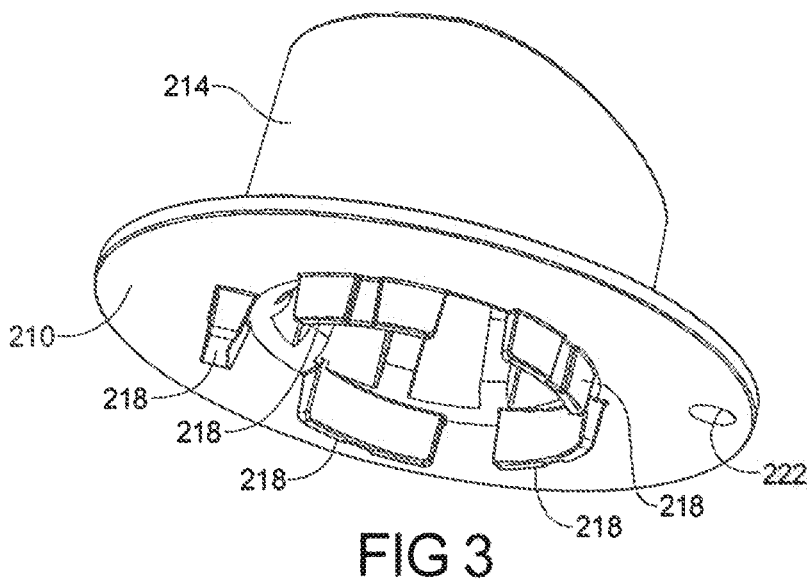
FIG. 3 is a different perspective view of the striker of FIG. 2.

With additional reference to FIGS. 2 and 3, the striker 26 is illustrated in greater detail. The striker 26 is generally coupled to the spring link 22 and configured to strike the jounce bumper 30 when the spring link 22 rotates about the first axis 74 to prevent the spring 18 from bottoming out (e.g. the coils of the spring becoming fully compressed). In an alternative construction (not specifically shown), the jounce bumper 30 is coupled to the spring link 22 and the striker 26 is coupled to the upper spring perch 28. In the example provided, the striker 26 includes a rim 210, a body 214, and a plurality of protrusions 218, though other configurations can be used.

The rim 210 is configured to be received in the cavity 78 and to rest upon the bottom wall 82. In the example provided, the rim 210 has a thin, circular shape that is coaxial with the lower portion of the spring 18. In the example provided, the rim 210 defines a bore 222 and a fastener 226 (shown in FIG. 4) is received through the bottom wall 82 and the bore 222 to fixedly couple the striker 26 to the spring link 22. The protrusions 218 extend from a bottom of the rim 210 and are spaced apart and disposed circumferentially about the rim 210. Each of the protrusions 218 is received in one of the apertures 94 of the bottom wall 82 to prevent rotation of the striker 26 relative to the spring link 22.

The body 214 is a generally cylindrical shape that extends upward from the rim 210 and has a striker surface 230 that is distal to the rim 210. The striker surface 230 is generally convex toward the jounce bumper 30. In the example provided, the striker surface 230 is a two-dimensional surface having a cross-sectional profile (e.g. taken along longitudinal line 234), such that any point on the striker surface 230 taken along a transverse line (e.g. one of lines 238 that are perpendicular to longitudinal line 234) has the same minimum distance to a plane 240 that is parallel with the rim 210 as any other point on that line. The striker surface 230 can also have a flat area 242 in addition to a convex or curved area 244. The flat area 242 is parallel to the plane 240 and is located proximate to an inboard side 246 of the striker 26. The flat area 242 transitions into the curved area 244. The curved area 244 is curved such that the striker surface 230 is further from the plane 240 at the inboard side 246 of the striker 26 and continuously becomes closer to the plane 240 (in a convex manner relative to the jounce bumper 30) as the striker surface 230 progresses to an outboard side 248 of the striker 26. The exact profile curve of the striker surface 230 is described in greater detail below. In the example provided, the bore 222 in the rim 210 is located at the outboard side 248 of the striker, though other configurations can be used.

With additional reference to FIGS. 4 and 5, the jounce bumper 30, the spring link 22, and the striker 26 are shown in a first position (FIG. 4) and a second position (FIG. 5). In the first position, the free end 110 of the jounce bumper 30 contacts the striker surface 230 at a first location 250. The first location 250 is a distance from the first axis 74 indicated by a constant value R. In the example provided, the first location 250 has a slope relative to the rim 210 and is located on the second axis 114 such that the jounce bumper 30 is generally centered over the first location 250. As the spring link 22 rotates in direction 254 about the first axis 74, the spring link 22 rotates at an angle indicated by variable θ. As the spring link 22 rotates through different angles θ, the jounce bumper 30 compresses against the striker surface 230 and the free end 110 of the jounce bumper 30 contacts the striker surface 230 at different locations that are located a distance from the first axis 74 indicated by a variable r. Thus, $r_0$ is equal to R.

For example, when in the second position, the free end 110 contacts the striker surface 230 at a second location 258 that is different than the first location 250. In the example provided, the second location 258 has a slope relative to the rim 210 that is different than the slope at the first location 250. In the example provided, the second location 258 is located on the second axis 114 such that the jounce bumper 30 is generally centered over the second location 258 when in the second position. The second location 258 is a distance $r_1$ from the first axis 74 and the angle that the spring link 22 and striker 26 have moved relative to the first position is $\theta_1$. Due to the compression and deformation of the jounce bumper 30, it is understood that a portion of the free end 110 may continue to contact the striker surface 230 at the first location 250 while the jounce bumper 30 engages the second location 258.

In the example provided, the relationship between the angle θ of the spring link 22 and the distance r from the first axis 74 to the location on the striker surface 230 that contacts the jounce bumper 30 is mathematically expressed in the equation below.

$$\theta = \left(\frac{\sqrt{r^2 - R^2}}{R}\right) - \tan^{-1}\left(\frac{\sqrt{r^2 - R^2}}{R}\right)$$

In the equation above, variable θ represents the angular position of the spring link 22 and striker 26, constant R represents the distance from the first axis 74 to the initial central point of contact between the striker 26 and the jounce bumper 30, and variable r represents the distance from the first axis 74 to the central point of contact between the striker 26 and the jounce bumper 30 at a given angular position θ, as described above.

In operation, when the vehicle traverses over terrain that causes the hub 42 to move up and down (i.e. the spring link 22 rotates about the first axis 74), the spring 18 compresses and expands accordingly and the jounce bumper 30 can contact the striker 26 to prevent the spring 18 from bottoming out. The striker surface 230 profile described above ensures that the striker surface 230 impacts the jounce bumper 30 at a perpendicular angle, such that the impact force of the striker 26 on the jounce bumper 30 acts along the second axis 114. The profile of the striker surface 230 thus eliminates or minimizes forces between the striker 26 and the jounce bumper 30 that would act transverse to the second axis 114. In other words, the profile of the striker surface 230 ensures that the jounce bumper 30 compresses along the second axis 114 instead of buckling or bending transverse to the second axis 114.

The descriptions above are merely exemplary in nature and, thus, variations that do not depart from the gist of the present disclosure are intended to be within the scope of the invention. Such variations are not to be regarded as a departure from the spirit and scope of the invention.

What is claimed is:

1. A vehicle suspension comprising:
an upper member;
a lower member configured to pivot relative to the upper member;
a spring configured to bias the lower member away from the upper member;
a jounce bumper fixedly coupled to one of the upper and lower members; and
a striker fixedly coupled to the other one of the upper and lower members, the striker having a striker surface configured to contact the jounce bumper when the lower member is pivoted to compress the spring greater than a predetermined amount, the striker surface being convex toward the jounce bumper;
wherein the lower member is pivotable between a first position wherein the jounce bumper makes initial contact with the striker surface, and a second position wherein the jounce bumper is compressed against the striker surface, wherein the striker surface is curved such that a portion of the striker surface that is along a central axis of the jounce bumper and in contact with the jounce bumper remains perpendicular to the central axis of the jounce bumper while the lower member moves between the first and second positions.

2. The vehicle suspension of claim 1, wherein an entire surface area of the striker surface that is configured to contact the jounce bumper is convex.

3. The vehicle suspension of claim 1, further comprising a chassis, the lower member having opposing ends including a chassis attachment end and a hub attachment end, the chassis attachment end being pivotably coupled to the chassis, the hub attachment end being configured to be coupled to a wheel hub, wherein the striker includes a base mounted to the lower member, the striker surface sloping toward the base with increased distance from the chassis attachment end.

4. The vehicle suspension of claim 3, wherein the lower member extends in an outboard direction from the chassis attachment end to the hub attachment end.

5. The vehicle suspension of claim 1, wherein the spring is a coil spring coiled about the jounce bumper and the striker.

6. The vehicle suspension of claim 1, wherein the striker surface is defined by $$\theta = \left(\frac{\sqrt{r^2 - R^2}}{R}\right) - \tan^{-1}\left(\frac{\sqrt{r^2 - R^2}}{R}\right),$$

wherein θ is an angle between the lower member in the first position and the lower member in the second position, wherein R is a constant that is a distance between a pivot axis about which the lower member pivots and a central contact point when the lower member is in the first position, the central contact point being a point on the jounce bumper along the central axis that contacts the striker surface, and wherein r is a distance from the pivot axis to the central contact point at a given angular position θ.

7. The vehicle suspension of claim 1, wherein the jounce bumper is fixedly coupled to the upper member and the striker is fixedly coupled to the lower member.

8. The vehicle suspension of claim 1, wherein the jounce bumper is fixedly coupled to the lower member and the striker is fixedly coupled to the upper member.

9. A vehicle suspension comprising:
an upper member;
a lower member configured to pivot between a first position and a second position relative to the upper member;
a spring configured to bias the lower member away from the upper member;
a jounce bumper fixedly coupled to one of the upper and lower members; and
a striker fixedly coupled to the other one of the upper and lower members, the striker having a striker surface configured to contact the jounce bumper at a central contact point of the jounce bumper at an angle that is perpendicular to a central axis of the jounce bumper when the lower member is in the first and second positions, the central contact point being along the central axis of the jounce bumper.

10. The vehicle suspension of claim 9, wherein the striker surface is convex toward the jounce bumper along an entire surface area of the striker surface that contacts the jounce bumper when the lower member is between the first and second positions.

11. The vehicle suspension of claim 9, further comprising a chassis, the lower member having opposing ends including a chassis attachment end and a hub attachment end, the chassis attachment end being pivotably coupled to the chassis, the hub attachment end being configured to be coupled to a wheel hub, wherein the striker includes a base mounted to the lower member, the striker surface sloping toward the base with increased distance from the chassis attachment end.

12. The vehicle suspension of claim 11, wherein the lower member extends in an outboard direction from the chassis attachment end to the hub attachment end.

13. The vehicle suspension of claim 9, wherein the spring is a coil spring coiled about the jounce bumper and the striker.

14. The vehicle suspension of claim 9, wherein when the lower member is in the first position the jounce bumper makes initial contact with the striker surface, and wherein when the lower member is in the second position the jounce bumper is compressed against the striker surface.

15. The vehicle suspension of claim 9, wherein the striker surface is defined by $$\theta = \left(\frac{\sqrt{r^2 - R^2}}{R}\right) - \tan^{-1}\left(\frac{\sqrt{r^2 - R^2}}{R}\right),$$

wherein θ is an angle between the lower member in the first position and the lower member in the second position, wherein R is a constant that is a distance between a pivot axis about which the lower member pivots and the central contact point when the lower member is in the first position, and wherein r is a distance from the pivot axis to the central contact point at a given angular position θ.

16. The vehicle suspension of claim 9, wherein the jounce bumper is fixedly coupled to the upper member and the striker is fixedly coupled to the lower member.

17. The vehicle suspension of claim 9, wherein the jounce bumper is fixedly coupled to the lower member and the striker is fixedly coupled to the upper member.

\* \* \* \* \*